United States Patent [19]

McAllise

[11] 4,160,192
[45] Jul. 3, 1979

[54] DELAYED TURN-OFF SWITCHING CIRCUIT

[76] Inventor: Raymond J. McAllise, 1812 Bruce St., Canal Fulton, Ohio 44614

[21] Appl. No.: 803,137

[22] Filed: Jun. 3, 1977

[51] Int. Cl.² .................. G05F 1/00; H05B 37/02; H05B 39/04; H05B 41/36
[52] U.S. Cl. ................................. 315/194; 315/307; 315/362; 315/DIG. 4
[58] Field of Search ............ 307/246, 252 B, 252 N, 307/293; 315/127, 194, 291, 307, 362, DIG. 4

[56] References Cited

U.S. PATENT DOCUMENTS 3,732,484  5/1973  McKenna ........................... 323/19

OTHER PUBLICATIONS

RCA Technical Notes No. 715, Jun. 1967, "Triggerless Phase Control Circuit for Sensitive Gate Triacs", R. J. Buczynski.

Primary Examiner—Alfred E. Smith
Assistant Examiner—Robert E. Wise
Attorney, Agent, or Firm—Frease & Bishop

[57] ABSTRACT

An electronic circuit for de-energizing a lamp or other load after a predetermined period of time uses a gate controlled switch, e.g., thyristor, connected between the load and a source of A.C. voltage. The gate of the thyristor receives control current through a capacitor across which is connected a manual switch. In order to maintain the lamp energized, the switch is closed, by-passing the capacitor, so that uninterrupted gate current flows into the thyristor gate terminal to maintain the thyristor on. The delayed turn-off function is provided by opening the manual switch, whereby the capacitor in the thyristor gate charges up at a rate determined by an RC time constant. The charge build-up on the capacitor decreases the magnitude of gate current until the thyristor turns off due to gate current starvation. Several different embodiments of the circuit are disclosed.

5 Claims, 16 Drawing Figures

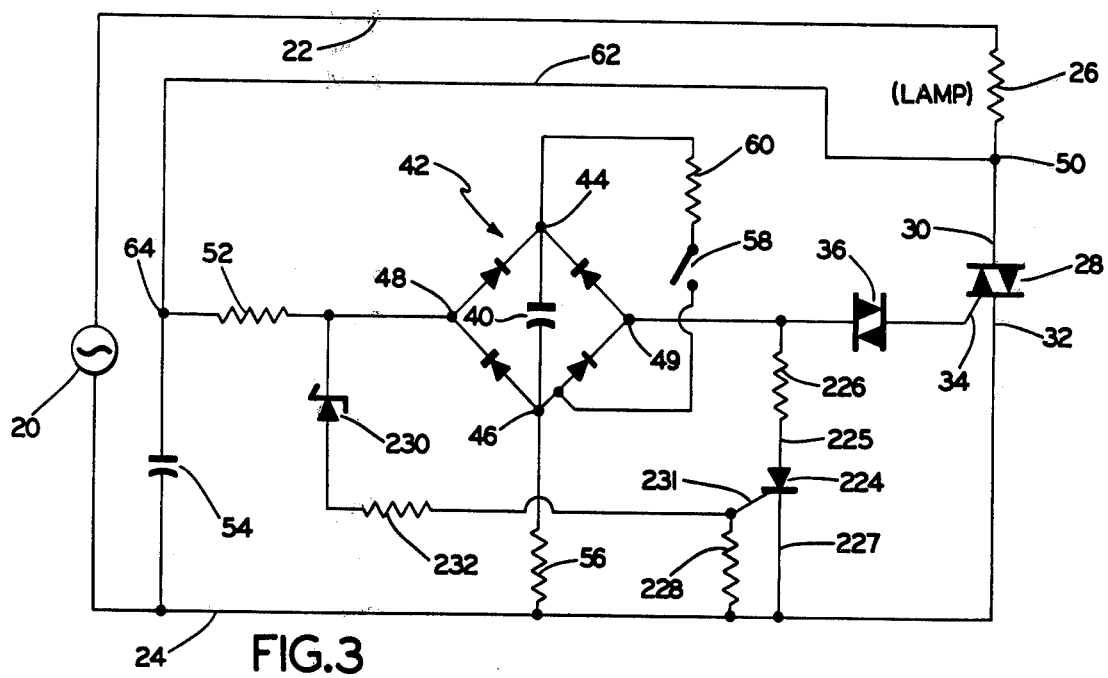
FIG.3
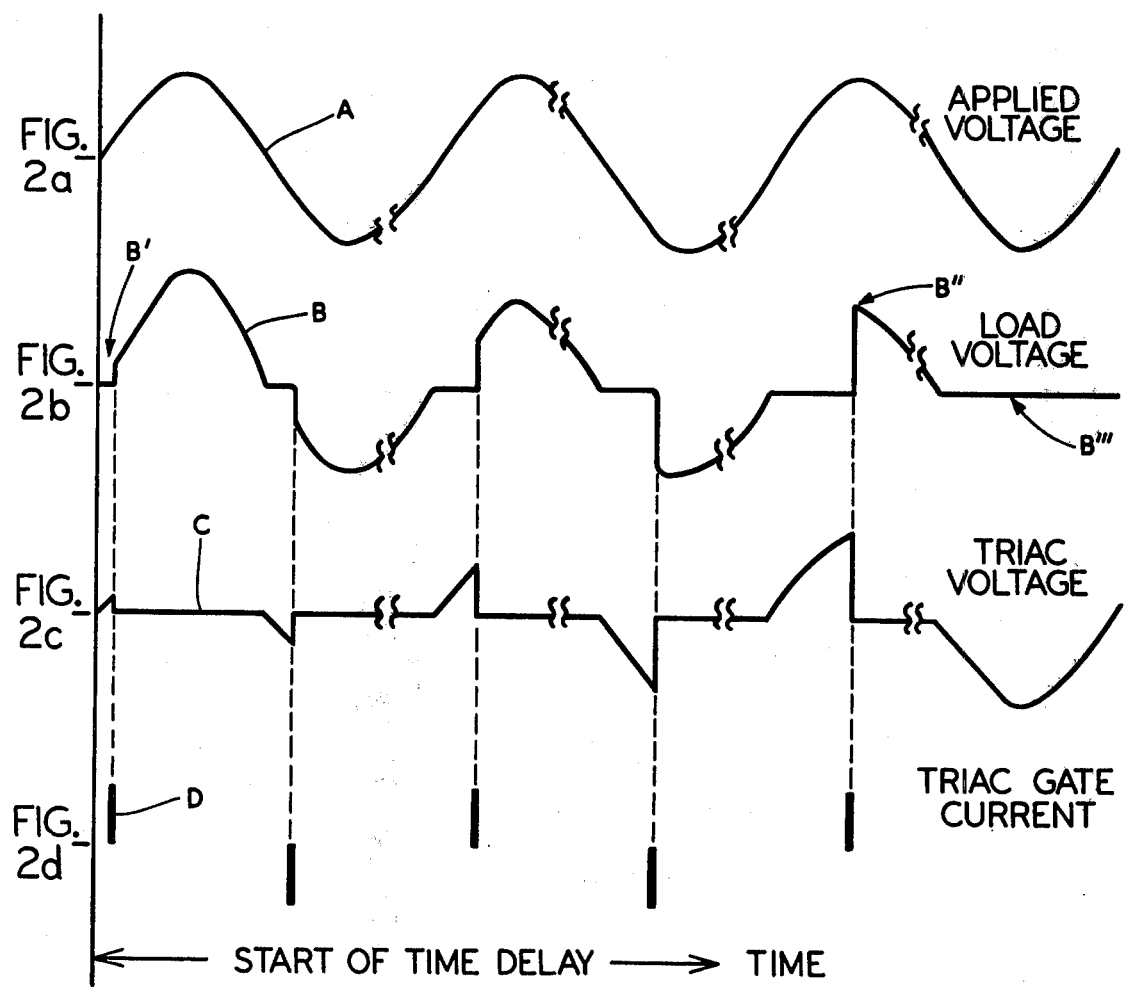
FIG. 2a — APPLIED VOLTAGE
FIG. 2b — LOAD VOLTAGE
FIG. 2c — TRIAC VOLTAGE
FIG. 2d — TRIAC GATE CURRENT
START OF TIME DELAY ⟶ TIME

DELAYED TURN-OFF SWITCHING CIRCUIT

BACKGROUND OF THE INVENTION

The present invention relates generally to delayed turn-off switching circuitry, and more particularly, toward thyristor controlled circuits for de-energizing a lamp or other load in a predetermined period of time following operation of a manual, automatic or electronic turn-off switch.

A need typically arises for a delayed turn-off circuit for a lamp or other load wherein the lamp is de-energized in a predetermined period of time following operation of a switch. For example, it is sometimes necessary to move between rooms in a house in the dark. It is desirable to have a lamp in one of the rooms remain on for a predetermined period of time after turn-off of the lamp, so that individuals may have adequate time to arrive at the second room in the light.

Prior art delayed turn-off switches of which I am aware involve electro-mechanical components such as dashpots, which wear-out after extended use, and over relatively short periods of time. Electronic systems to effect delayed turn-off of which I am aware utilize relatively involved unijunction transistor circuits that are used to control thyristors or power transistors. These circuits require the use of a large number of electronic components, decreasing overall reliability.

Accordingly, a primary object of the invention is to provide a new and improved delayed turn-off switching circuit for lamps and other electric loads.

Another object is to provide a new and improved delayed turn-off switch that is simple and reliable, and does not involve complex unijunction transistor circuitry.

Another object is to provide a new and improved delayed turn-off switching circuit which is highly reliable and uses no mechanical parts, such as dashpots.

BRIEF DESCRIPTION OF THE INVENTION

Briefly, in accordance with a broad aspect of the invention, energization of a lamp or other load by an A.C. voltage source is controlled by a gate controlled switch, or thyristor, having the load terminals thereof connected in series with the voltage source and lamp. The gate of the thyristor, which controls the ON/OFF condition thereof in response to gate current, is connected to receive gate current through a capacitor. A switch preferably manually activated is connected across the capacitor to selectively bypass it. A diode circuit is connected in the gate circuit to cause unidirectional or bidirectional current to flow into the gate terminal of the thyristor.

When the switch is closed, bypassing the capacitor, maximum gate current flows into the gate of the thyristor maintaining the thyristor on for full wave energization of the lamp. The lamp is thus in a "bright" mode of operation. When the bypassing switch is open, on the other hand, rectified current flows into the gate terminal of the thyristor through the capacitor. During each unidirectional one-half cycle, the capacitor charges slightly causing a gradual voltage build-up across the capacitor in a direction to reduce the magnitude of gate current. When the voltage on the capacitor is sufficiently high to reduce gate current to a nearly zero magnitude, the thyristor turns-off due to gate current starvation. Thereby, a delayed turn-off function is provided.

In accordance with a first embodiment of the invention, the thyristor is a Triac and the diode circuit in the gate of the Triac is a full wave diode bridge for passing full-wave gate current through the capacitor. A threshold device, such as a Diac, if used, is also connected in the gate circuit of the Triac to provide more positive turn-on of the Triac. An additional capacitor is connected between the input of the bridge and ground for stabilization of the Triac during turn-on; the additional capacitor supplies additional current into the Triac gate to help prevent time delay changes as a result of load changes.

A conventional dimmer circuit may be included in the delayed turn-off switching circuit to control the phase angle of load energization by the Triac. The dimmer circuit is connected between the input terminal of the full wave diode bridge and the load and phase shifts the gate control current with respect to the line voltage. The dimmer circuit is disabled during the delayed turn-off mode of operation, so that the load receives full wave energization (bright mode) prior to turn-off. Full wave meaning a complete cycle having positive and negative half cycles.

In accordance with one modification of the first embodiment, a single diode is provided in the gate circuit in series with the time delay capacitor in place of the full wave bridge so as to effect one-half wave energization of the load during the time delay period. A manual switch is connected in the gate circuit to selectively bypass the dimmer in the delayed turn-off mode and the gate circuit diode in a non-turn-off, dimmer mode. During the dimmer mode of operation, with the diode bypassed, there is full wave, phase modulated load energization in a manner similar to the dimmer circuit described directly above. During the delayed turn-off mode, on the other hand, with the dimmer bypassed, the Triac is controlled to energize the load with one-half wave current because the diode connected in series with the Triac gate turns on the Triac only during unidirectional one-half cycles of line voltage.

In another modification of the first embodiment, an SCR is connected between the gate of the Triac and ground. The SCR is controlled by a Zener diode connected to be responsive to line voltage. Early in each positive one-half cycle following turn-on of the Zener diode, the SCR is turned-on by current flowing through the Zener diode. The SCR provides a low impedance path to current flowing through the timing capacitor connected in the Triac gate circuit. The low impedance path decreases the charge up time of the capacitor so as to reduce the time delay period prior to turn-off for operation with fluorescent lamps.

In still another modification, a pair of timing capacitors are provided in the gate circuit of the Triac, instead of the single timing capacitor previously described. Steering diodes are also connected in the gate circuit to steer gate current so that the capacitors share opposite one-half cycles of current.

In accordance with a second embodiment of the invention, an SCR is connected within a four diode full wave rectifier circuit connected in series with a load and voltage source. Load current flows through the diode bridge bypassing the SCR during normal load energization. The SCR is turned on only during the delayed turn-off period, so that a relatively lower power SCR can be used and little or no heat sinking of the SCR is required.

In accordance with a third embodiment, the gate of a thyristor for controlling load energization is controlled by a three-way switching system which permits the load to be turned on or off from either of two remote stations. The three-way switching system controls current flow in a full-wave rectifier bridge connected in series with the gate of the Triac. The timing capacitor is located across the bridge circuit in parallel to an SCR which is controlled by the three-way switching system. During turn-off of the Triac for de-energizing the load, with the SCR initially off, the timing capacitor charges up as a result of the flow of Triac gate current therethrough until gate current is reduced by an amount sufficient to turn the Triac off. When the three-way switch is now operated to re-energize the load, the SCR is turned-on by current supplied to the gate thereof by the three-way switch to discharge the capacitor. Upon discharge, gate current once again flows into the gate of the Triac via the SCR.

In accordance with a fourth embodiment, a multiple position switch, such as a rotary switch, is connected in the gate circuit of the thyristor to selectively provide the following functions: full wave load energization, one half wave energization, delayed turn-off and off. Three versions of the fourth embodiment are disclosed. In the first and second versions, the multiple position switch is connected within a full wave bridge circuit in series with the gate of a Triac for controlling the load. Additional steering diodes are used in the circuit to provide the functions indicated in response to respective positions of the multiple position switch. In the third version, the multiple position switch is connected in the gate circuit of an SCR, together with additional steering diodes. The third version provides half wave operation during the delay period.

In accordance with a fifth embodiment of the invention, an SCR is used to control current flow through the load. Steering diodes are connected in the gate circuit of the SCR, together with the timing capacitor. Another diode is connected in parallel with the SCR in series with the load. The manual switch is connected in series with the last named diode, and provides full wave energization of the load when the switch is closed, and one-half-wave energization of the load during a delayed turn-off time period when the switch is open.

In each of the embodiments disclosed, a resistive load is controlled so as to provide a delayed turn-off function, and one of full wave, one half wave or phase controlled operation during energization prior to commencement of a delayed turn-off. During the delayed turn-off period, various ones of the embodiments provide full wave or one-half wave energization of the load.

Although the inventive circuits are preferably used in conjunction with a lamp load, it is understood that control of any other resistive load is also contemplated within the scope of the present invention.

Still other objects, advantages and features of the present invention will become readily apparent to those skilled in this art from the following detailed description, wherein I have shown and described only the preferred embodiments of my invention, simply by way of illustration of the best modes contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIGS. 2a-2d are waveforms illustrating the operation of the circuit shown in FIG. 1;

FIG. 3 is a schematic diagram of a circuit similar to the circuit shown in FIG. 1, including an SCR and Zener diode constituting a fast charge-up circuit to decrease the delayed turn-off period for fluorescent lamp loads;

DETAILED DESCRIPTION OF A PREFERRED EMBODIMENT

Figure 1:
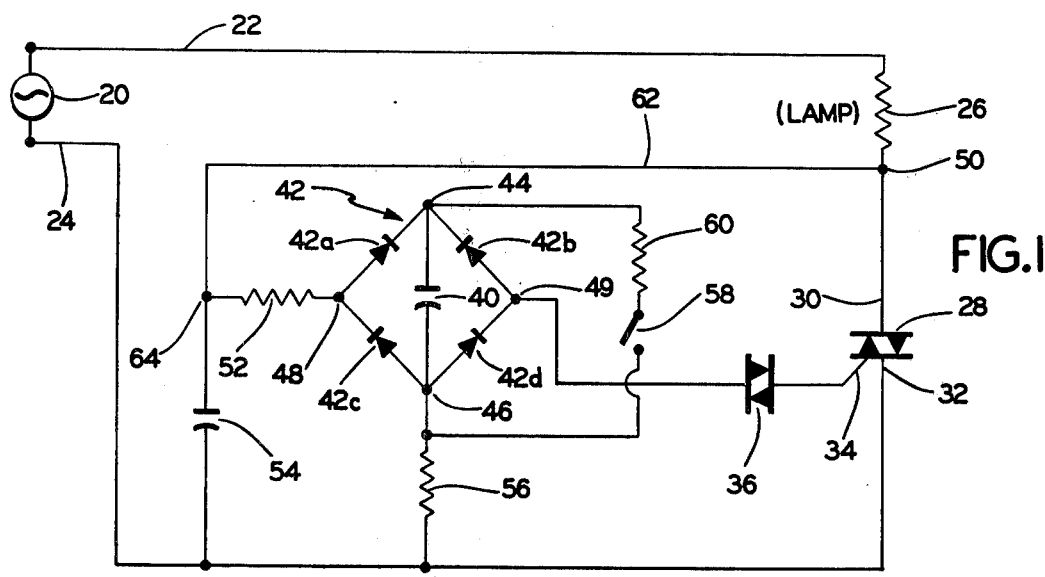
FIG. 1 is a schematic diagram of a first embodiment of the invention, wherein full wave energization of a load is controlled by a Triac, a delayed turn-off function being provided by a capacitor and a full wave bridge connected in the gate circuit of the Triac together with a manually activated switch for selectively bypassing the capacitor.

Referring to FIG. 1, an A.C. voltage source 20 is connected to supply lines 22 and 24, the latter being considered to be a ground line for the present description. The lines 22 and 24 are connected so as to supply electrical power to a load 26, such as a lamp, through a Triac 28. Triac 28 is a conventional, bi-directional, solid state switch having output terminals 30 and 32 as well as a gate terminal 34 operative to control the ON/OFF state of the Triac. Triac 28 functions as an open circuit blocking current flow through load 26 when current flow in gate terminal 34 is less than the required gate terminal. When there is positive or negative current flow in gate 34 of Triac 28, the Triac becomes bi-directionally conductive.

A bi-directional threshold device 36, such as a Diac, is connected to gate terminal 34 of Triac 28. Threshold device 36 is a conventional semiconductor component that blocks current flow in the gate circuit of Triac 28 until the voltage applied across device 36 exceeds a predetermined, built-in threshold value. The device 36 then "breaks down" and conducts gate current to Triac 28 to cause the Triac to turn on.

Also connected in the gate circuit of Triac 28 and in series with threshold device 36 is a capacitor 40 connected between terminals 44 and 46 of bridge 42 comprising diodes 42a–42d. Input terminal 48 of the bridge 42 is connected to load 26 at 50 through a resistor 52. A stabilizing capacitor 54 is connected between connection 50 and ground line 24, and a resistor 56 is connected between terminal 46 of bridge 42 and ground 24.

An ON/OFF switch 58 is connected across capacitor 40 through a resistor 60. Switch 58 electrically bypasses capacitor 40 when the switch is closed. Resistor 60 is a low valued resistor that limits the rate of discharge of capacitor 40 upon closure of switch 58, and serves to extend the lifetime of the capacitor.

In a load energizing mode of operation, wherein the load 26 is full-wave energized and at a steady state, e.g., lamp turned-on, switch 58 is closed, bypassing capacitor 40 through resistor 60. During each positive one-half-cycle of line voltage generated by source 20, current flows from line 22 through load 26 to connection 50. Assuming that Triac 28 is initially off, current flows through conductor 62 to connection 64, and then through resistor 52 to input terminal 48 of the diode bridge 42. Current now flows through diode 42a, resistor 60, switch 58, and diode 42d, respectively, to bridge output terminal 49.

A small amount of current also flows through resistor 56 to ground 24, but the resistance of resistor 56 is relatively large to maintain the current flow therethrough small.

A positive voltage is applied across threshold device 36, which is initially off. As the voltage from source 20 rises during the positive one-half cycle to a maximum value at a phase angle of 90°, the threshold device 36 turns-on when the voltage applied thereacross exceeds its built-in threshold voltage. Following turn-on of device 36, current flows therethrough into the gate 34 of Triac 28, turning the Triac on. Triac 28 turns on relatively early in the positive one-half cycle so that there is only a minimum discontinuity of current flowing through load 26. Triac 28 latches on for the remainder of the positive one-half cycle of load current passing therethrough in the usual manner as a result of a latching characteristic of the Triac.

The current flowing through the gate 34 of Triac 28 is limited by the resistance of load 26 in series with resistors 52 and 60 as well as by the internal resistances of the diodes 42a–42d, threshold device 36 and the Triac gate junction.

During the negative one-half cycle of line voltage, current flows from line 24 through the gate junction of Triac 28 to threshold device 36. After break-over of the threshold device 36, current flows through the device 36 to line 22 through diode 42b, resistor 60, switch 58, diode 42c, resistor 52 and load 26 respectively. Current flow through switch 58 and resistor 60 is in the same direction as described in connection with the positive one-half cycle of line voltage due to the full-wave rectification characteristic of bridge 42. Some additional current or "leakage" flows between lines 22 and 24 through resistor 56, diode 42c, resistor 52 and load 26, but the magnitude of the leakage is small.

Current flowing through the gate junction of Triac 28 turns the Triac on for the remainder of the negative one-half cycle, energizing load 26. Again, Triac 28 is turned-on by gate current early in the negative one-half cycle so that discontinuity in load current is minimized to reduce RFI generation. The size of the continuity is minimized by selecting a device 36 having a low threshold voltage.

Following turn-on of Triac 28 during positive and negative one-half cycles of line voltage, voltage between line 62 and ground 24 is approximately zero due to the low impedance of the Triac in the "ON" state. Accordingly, gate current during turn-on of the Triac 28 is approximately zero, but the conventional latching characteristic of the Triac maintains the Triac on until load current passing therethrough is reduced to zero at the completion of each one-half cycle.

In the delayed turn-off mode of operation, switch 58 is manually opened, thereby opening the bypass that was provided across capacitor 40 between terminals 44 and 46 of bridge 42. The current flow paths between lines 22 and 24 through gate 34 of the Triac 28 during the positive and negative one-half cycles of line voltage are now similar to the current flow paths described above, except that current now flows unidirectionally through capacitor 40 rather than through resistor 60 and switch 58. Upon opening of switch 58, the voltage drop across capacitor 40 is at zero volts, since the voltage drop across any capacitor cannot change instantaneously, as is well known. However, as capacitor 40 begins charging up toward the voltage applied between connection 50 and ground line 24, the magnitude of current flowing through gate 34 of Triac 28 correspondingly decreases. At some time, determined by the RC time constant of the gate circuit, the gate current becomes less than the "holding current" of the gate 34, and Triac 28 turns-off due to gate current starvation, thus blocking both positive and negative one-half cycle load current.

Referring to FIGS. 2a–2d, several waveforms are described in connection with the delayed turn-off function described above. In FIG. 2a, there is shown a sinusoidal voltage waveform A applied to lines 22 and 24 by voltage source 20. Waveform B (FIG. 2b) represents the voltage applied across load 24, and waveform C in FIG. 2c represents the voltage applied across Triac 28, which is complementary to the load voltage waveform B in FIG. 2b. The vertical dotted lines shown represent the instant in time during each half cycle when the threshold switch 36 breaks down, supplying current pulses D to gate 34 of Triac 28, as shown in FIG. 2d.

As is clear from FIGS. 2b and 2c, Triac 28 turns-on for the remainder of each one-half cycle following receipt of a gate current pulse D shown in FIG. 2d. As can also be readily seen, the turn-on time in each one-half cycle is successively later in time relative to the preceeding one-half cycles, reflecting the gradual voltage built-up across capacitor 40. That is, the instantaneous voltage applied to device 36 corresponds to the value of the difference between the instantaneous voltage between line 62 and ground 24 and the instantaneous voltage across capacitor 40. As the voltage across capacitor 40 builds-up, the difference voltage decreases so that the threshold voltage of device 36 is exceeded later in successive one-half cycles of line voltage.

The time scale shown in FIG. 2b is greatly compressed; in practice, the time duration passing between Triac turn-on at the beginning of each half cycle as shown at B' on the left-hand side of FIG. 2b and Triac turn-on at a line phase angle 90°, as shown at B" on the right-hand side, may be several seconds or minutes. Finally, when the difference voltage is less than the threshold voltage of device 30, the voltage applied across capacitor 40 is large, there is no turn-on of device 36, and Triac 28 is maintained off, as shown at B''' on the right-hand side of FIG. 2b.

The period of time required to permit capacitor 40 to charge up to a voltage sufficient to turn the Triac 28 off is determined primarily by the value of capacitor 40 as well as of resistor 52 and resistor 56. Capacitor 40 remains charged until switch 58 is subsequently closed causing the charge on the capacitor to flow through resistor 60 and the switch 58 at a discharge rate limited by the value of the resistor 60, as aforementioned. The purpose of capacitor 54 connected between connection 64 and ground 24 is to stabilize the time delay with load changes.

The circuit shown in FIG. 3 is similar to the circuit shown in FIG. 1, except that there is included an SCR 224 connected between junction 49 of bridge 42 and ground line 24 through current limiting resistor 226. SCR 224 is a conventional silicon controlled rectifier which is a solid state switch having output terminals 225 and 227 as well as a gate terminal 231. The SCR conducts load current from terminal 225 to terminal 227 only in response to current flowing into the gate junction of the SCR, and then latches on to load current until the magnitude of the load current becomes or passes through zero or is less than the required holding current. Gate terminal 231 is connected to bridge junction or terminal 48 through a Zener diode 230 and a resistor 232.

The purpose of the SCR 244 and associated circuitry is to decrease the time delay prior to turn-off of Triac 28 to de-energize the load 26 following opening of switch 58. During each positive one-half cycle of operation of voltage source 20, the voltage at bridge junction 49 increases sinusoidally with current flowing through capacitor 40 into gate 34 of Triac 28. When the Zener diode threshold voltage of diode 230 has been exceeded, positive current flows into gate 231 of SCR 244, thereby turning the SCR on. Upon turn-on of SCR 244, current flows from bridge junction 49 to ground terminal 24 through resistor 226 and SCR 244, as well as into the gate 34 of Triac 28. The additional current flowing through SCR 224 causes the capacitor 40 to charge up at a faster rate. The voltage across the capacitor 40 thus increases more quickly, decreasing time delay prior to turn-off of the Triac 28.

Resistor 228 serves as a stabilizing resistor for resistor 224 tending to temperature-stabilize the gate junction of the SCR as well as to current de-sensitize the junction. Capacitor 54 is a stabilizing capacitor to help stabilize the time delay with load changes.

Figure 4A:
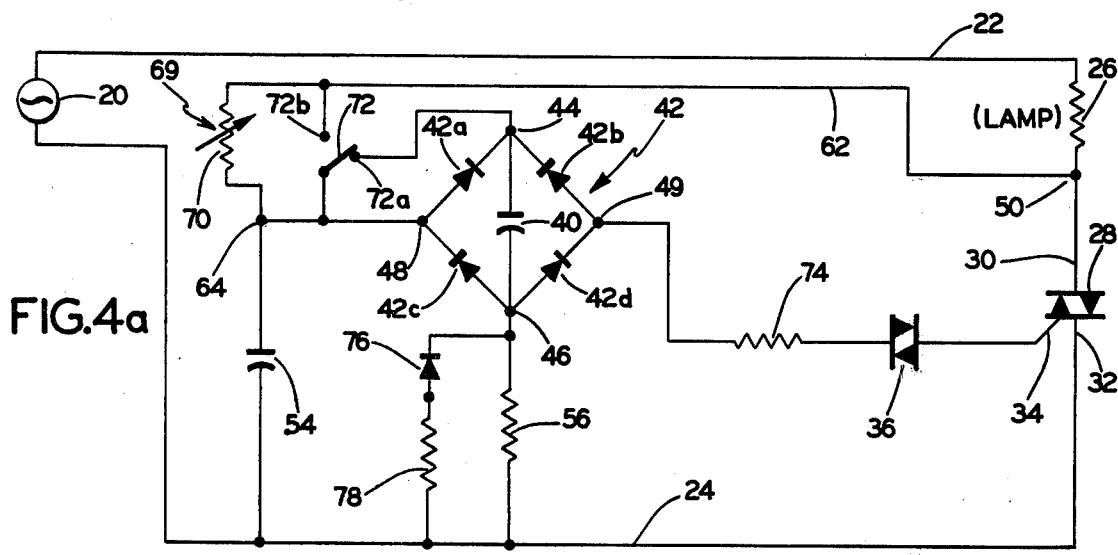
FIG. 4a is a schematic diagram of another embodiment of the delayed turn-off switching circuit including dimming circuitry for controlling the firing angle of the output thyristor.

Referring to FIG. 4a, a circuit similar to the circuit of FIG. 1 is shown, having added thereto a conventional phase-control or dimmer circuit 69 for modulating the phase angle of load current flowing through lamp load 26 and Triac 28. Dimmer circuit 69 comprises a potentiometer 70 together with a bypassing switch 72 connected in series with capacitor 54. The potentiometer 70 and capacitor 54 cooperate to shift the phase of gate current supplied to gate 34 of Triac 28 relative to line voltage to provide phase control of load energization. This concept is not described in detail, because it is conventional.

Preferably, the dimmer 69 is provided in a single assembly including the switch 72 and potentiometer 70 whereby the shaft (not shown) of the potentiometer 70 is manually actuated to operate switch 72 in a conventional manner. In the position shown in FIG. 4a, with the operator of switch 72 connected to terminal 72a, the circuit FIG. 4a operates in a dimming mode of operation whereby load 26 receives phase controlled load current at a phase angle depending upon the setting of potentiometer 70. With operator 72 connected to switch terminal 72b, on the other hand, potentiometer 70 is electrically bypassed and the circuit operates in a delayed turn-off mode in a manner similar to the circuit shown in FIG. 1 with the load 26 being fully energized (full brightness) prior to turn-off of Triac 28.

In the lamp dimming mode of operation, the operator of switch 72 is connected to contact 72a, as shown. During each positive one-half cycle of energization by voltage source 20, assuming that Triac 28 is initially off, current flows from line 22 to line 62 through potentiometer 70 to connection 64. Current flows from connection 64 to ground line 24 through capacitor 54, and also from the connection 64 to junction 48 of bridge circuit 42. Since the operator of switch 72 is connected to switch terminal 72a, the current bypasses diode 42a, and flows from bridge junction 44 to bridge junction 46 through capacitor 40 and to bridge junction 49 through diode 42d. The current then flows from junction 49 to line 24 through resistor 74, threshold device 36 and the gate 34 of Triac 28, turning the Triac on when the threshold of device 36 is exceeded. Once Triac 28 is turned-on, the voltage at connection 50 drops toward ground voltage, electrically bypassing the diode bridge 42. Triac 28 remains ON for the remainder of the positive half cycle, however, due to the latching characteristic thereof.

During the negative half cycle, current flows from source 20 through gate 34 of Triac 28, to bridge junction 49 following break down of device 36. The current flows through diode 42b to connection 64 via switch 72 and then to line 20 through potentiometer 70 and load 26. Any charge accumulated on capacitor 40 from the positive half cycle of current flow tends to leak from the capacitor through switch 72, capacitor 54 and resistor 56.

The provision of potentiometer 70 and capacitor 54 causes phase lag of the voltage applied across threshold device 36 in the gate circuit of Triac 28 relative to the voltage waveform on lines 22 and 24. This phase lag controls the firing angle of Triac 28 resulting in phase angle control, in a well known manner.

Diode 76 and resistor 78 are connected between junction 46 of bridge 42 and ground line 24. The purpose of diode 76 and resistor 78 is to increase the speed of discharge of capacitor 40 by bypassing resistor 76 with a smaller valued resistor 78 in the discharge path and to prevent oscillation of the circuit when potentiometer 70 is at a large value of resistance, that is, when light intensity called for is very low.

In the delayed turn-off mode of operation, the operator of switch 72 is connected to contact 72b so that potentiometer 70 is electrically bypassed. In this mode, the circuit functions in a manner identical to the circuit in FIG. 1 with switch 58 open, as described in detail above in connection with that Figure.

Figure 4B:
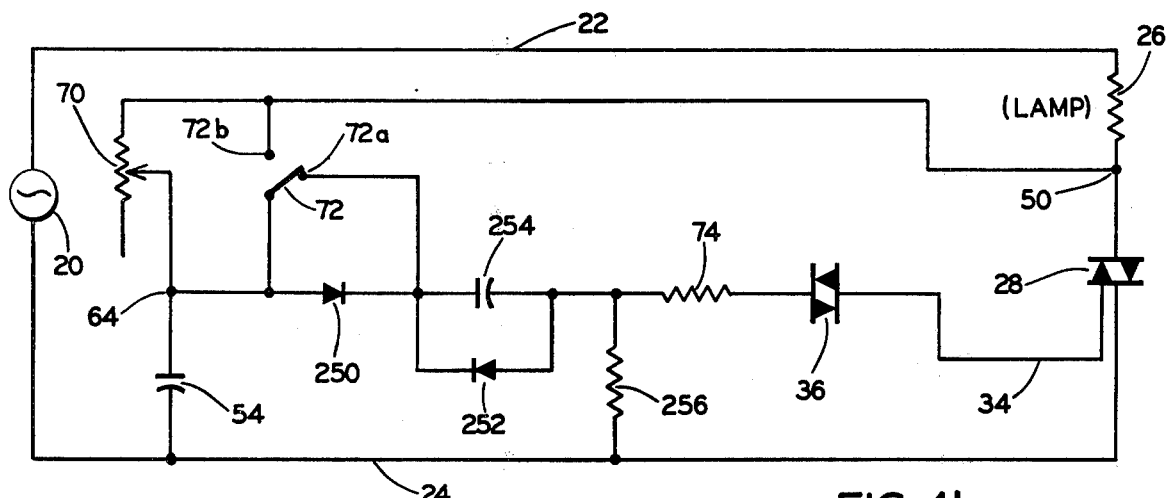
FIG. 4b is a schematic diagram of a modification of the circuit shown in FIG. 4a wherein a single diode is connected on the gate circuit of a Triac for one-half wave load energization during the delayed turn-off period.

The embodiment shown in FIG. 4b is similar to the embodiment shown in FIG. 4a, except that one-half wave energization of load 26 rather than full wave energization is provided during the delayed turn-off period. Junction 64 between potentiometer 70 and capacitor 54 is connected to gate 34 of Triac 28 through the series connection of diode 250, capacitor 254, resistor 74 and threshold device 36. Diode 252 is connected across capacitor 254 in opposition to diode 250 and resistor 256 is connected between the anode of diode 252 and ground line 24.

When switch operator 72 is connected to contact 72b (it is in the time delay operation mode), potentiometer 70 is electrically bypassed and gate current to Triac 28 from junction 64 is established through diode 250 during the positive half cycles of line voltage. Also, during the positive half cycles of line voltage, there is charge build-up established on capacitor 254. The Triac 28 is turned-on during each positive one-half cycle following break over of threshold device 36 providing load current flow through load 26 during the remainder of each positive half cycle.

During the negative one-half cycles of line voltage when in the time delay operation mode, gate current flows through the gate 34 of Triac 28 is blocked by diode 250; thus, the Triac 28 is maintained OFF during the negative one-half cycles, resulting in half wave energization of load 26. In the preferred embodiments, load 26 is an electric lamp that is thereby maintained in a dim mode of time delay operation.

Assuming now that switch operator 72 is moved to establish connection with contact 72a, diode 250 is electrically bypassed, and there is full wave, phase controlled operation of Triac 28 in a manner similar to that described in connection with FIG. 4a, above, with diode 252 providing half cycle charging of capacitor 254, it is discharged after the Triac 28 is turned on and during the negative half cycle. The delayed turn-off period can be larger than the turn-off period of the circuit of FIG. 1 where there is full wave charging of the capacitor 40.

Figure 5:
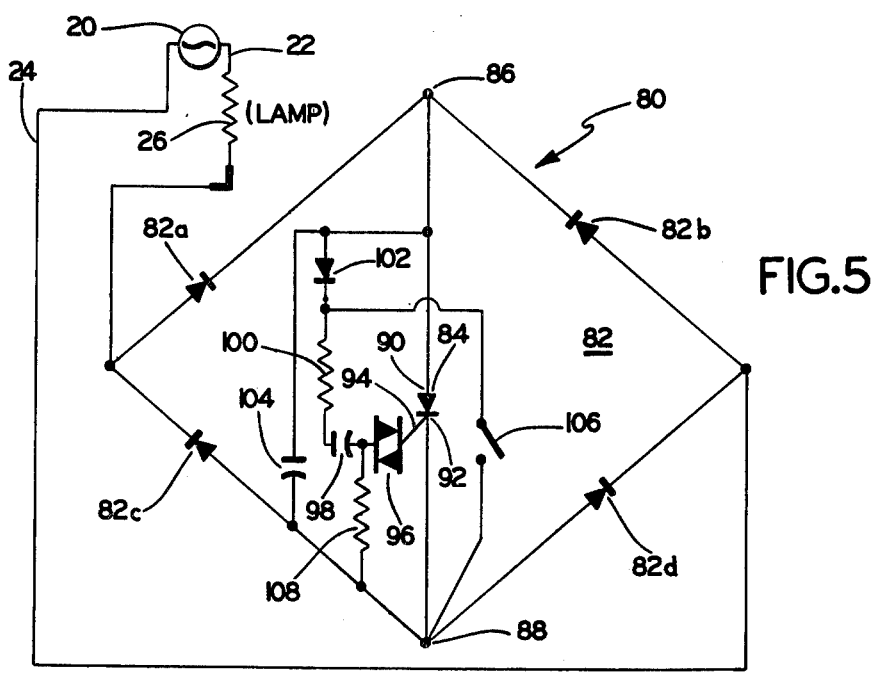
FIG. 5 is a schematic diagram of another embodiment of the invention, wherein energization of a load is controlled by an SCR connected within a full wave bridge, the SCR being turned-on only during the delayed turn-off period.

In accordance with another embodiment of the invention shown in FIG. 5, power source 20, which is an A.C. voltage source, or alternatively, a source of rectified A.C. voltage, is connected to lines 22 and 24 for supplying current to load 26, such as a lamp, under the control of circuit 80. The control circuit 80 comprises a full wave rectifier bridge 82 having diodes 82a–82d connected in a conventional full wave rectification configuration. An SCR 84 is connected between terminals or junctions 86 and 88 of the bridge 82. SCR 84, which is conventional, has an anode terminal 90 and a cathode terminal 92 functioning as output terminals in addition to a gate terminal 94.

Connected in series with the gate 94 of SCR 84 is threshold device 96, corresponding to device 36 in FIG. 1, as well as capacitor 98 and resistor 100. The resistor 100 is connected to a diode 102 which in turn is connected to junction 86 of bridge 82. A capacitor 104 is connected between junctions 86 and 88 of the bridge 82.

A manually operated switch 106 is connected between the cathode of diode 102 and junction 188 of bridge 82. Switch 106 is normally closed so that, during the positive half cycles, current flows from positive line 22 of voltage source 20 through load 26, and into bridge 82 through diode 82a to junction 86. The positive half cycle current then flows into diode 102 and bypasses SCR 84 through switch 106, passing to ground line 24 through bridge diode 82d. During the negative half cycles, current flows from around line 24 to line 22 through diode 102 by way of diodes 82d, 82c and switch 106.

Accordingly, during normal energization of load 26, no current flows through SCR 84, the load current during the positive and negative half cycles flowing through diode 102 and switch 106. As discussed below, SCR 84 conducts only during the delayed turn-off period following the opening of switch 106.

When it is desired to de-energize load 26, switch 106 is manually opened. During both positive and negative half cycles, current now flows from junction 86 of bridge 82 through diode 102 to the gate of SCR 84 through resistor 100, capacitor 98 and threshold device 96. Following break over of the threshold device 96, gate current enters the gate 94 of SCR 84, turning the SCR on.

During each successive positive and negative half cycle of current flow into the gate 94 of SCR 84, charge build-up occurs on capacitor 98, until, as described in connection with FIG. 1, the voltage across the capacitor is large enough to prevent SCR 84 from being turned on by gate current, and load 26 is de-energized.

The time delay before turn-off of SCR 84 following opening of switch 106 is determined primarily by the values of resistors 100 and 108 as well as capacitor 98. Capacitor 104 provides the function of suppressing transients occuring between junctions 86 and 88 of the bridge 82 thereby preventing undesired break over of the SCR 84. Capacitor 104 also tends to make the time delay period for delayed turn-off of SCR 84 substantially independent of the load 26.

Figure 6:
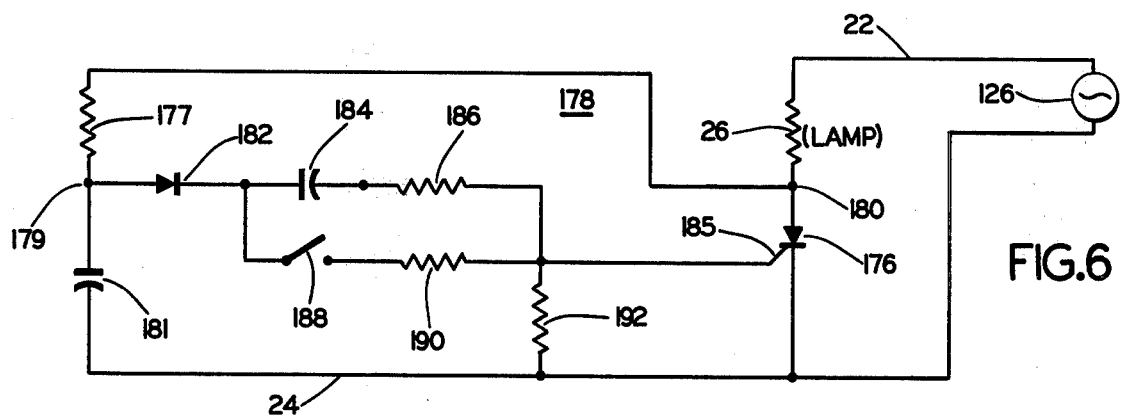
FIG. 6 is a schematic diagram of another embodiment of a delayed turn-off switch, in accordance with the present invention, wherein full wave unidirectional energization of a load is controlled by an SCR if rectified full wave D.C. is the source voltage, but it is half-wave unidirectional if the source voltage is A.C.

In accordance with another embodiment of the invention shown in FIG. 6, a delayed turn-off switching circuit 178 is adapted to operate with a source 176 of full wave D.C. or one-half wave alternating voltage. Full wave direct voltage generated by source 126 energizes lamp load 26 at full brightness whereas one-half wave direct voltage energizes lamp load 26 at one-half voltage. The circuit 178 comprises a resistor 177 and capacitor 181 connected in series between ground line 24 and connection 180 functioning as a gate current supply source. Connected to the junction 179 between resistor 177 and capacitor 181 is diode 182, and between diode 182 and gate 184 of SCR 176 are connected capacitor 184 and resistor 186. Also connected between the diode 182 and gate 185 are switch 184 and resistor 186. A current stabilization resistor 192 is connected between the gate and ground line 24. If desired, a threshold device (not shown) such as a Diac, can be included in the gate of the SCR 176 to establish a more reliable turn-on threshold for the SCR and greater time delay.

During each positive one-half cycle of voltage generated by source 176, current flows from line 22 through load 26 and resistor 177 to the junction 179 between the resistor 177 and capacitor 181. Assuming that switch 188 is closed, capacitor 184 and resistor 186 are bypassed by resistor 190. Since there is current flow established from connection 179 to gate 185 of SCR 176, the SCR is maintained on, energizing the load 26. Upon turn-on of SCR 176, the voltage at connection 180 becomes approximately equal to ground voltage. Current now flows through SCR 176 to ground, rather than into the gate thereof. SCR 176 is maintained ON for the remainder of the one-half cycle, however, due to the latching characteristic thereof.

On the other hand, when switch 188 is open, gate current flows from connection 179 to gate 185 through capacitor 184 and resistor 186. As the capacitor 184 charges up, the voltage across capacitor 184 increases, decreasing the magnitude of current flowing into gate 185 of SCR 176, until the SCR turn-off. The period of time before turn-off of SCR 176 is determined primarily by the values of capacitor 184 and resistors 186 and 192.

Figure 7:
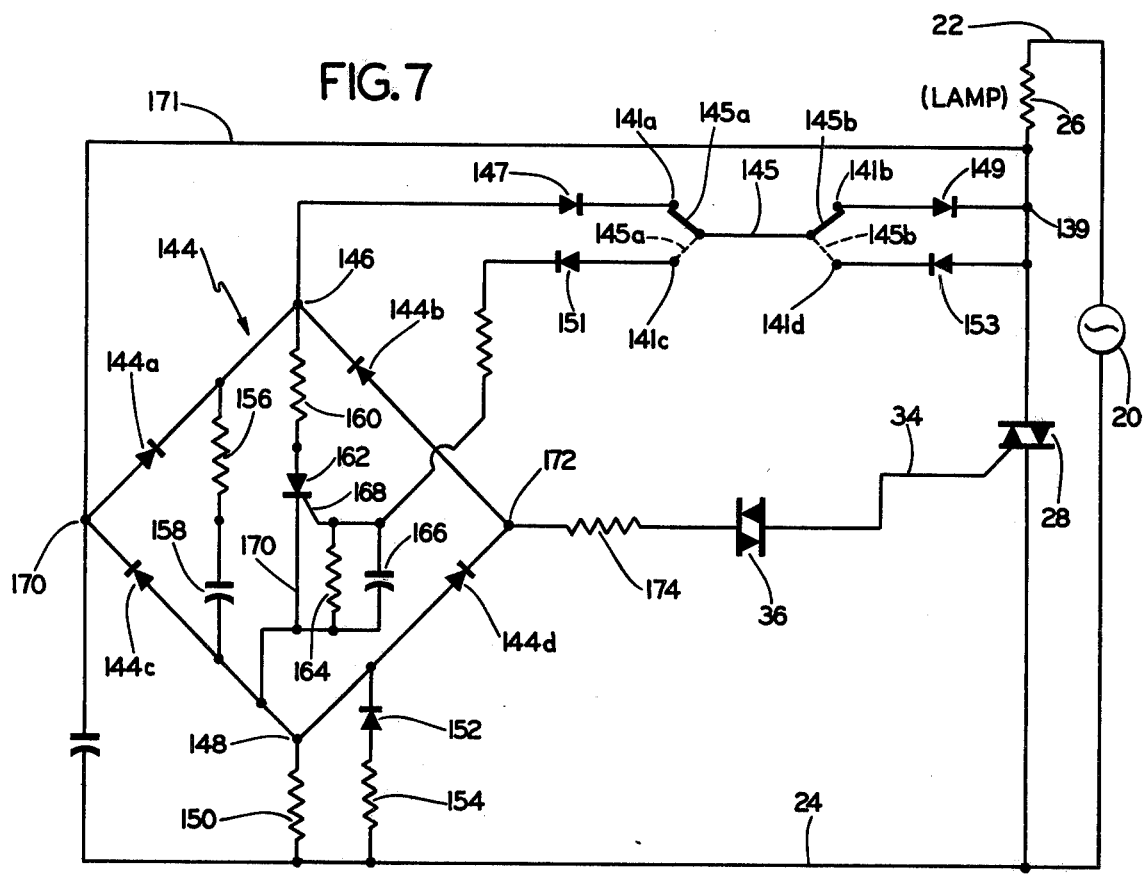
FIG. 7 is a schematic diagram of a delayed turn-off switch, in accordance with the invention, including a three-way switching circuit for controlling the ON/OFF state of a Triac from either of two remote locations.

Referring now to FIG. 7, in accordance with another embodiment of the invention, there is provided a conventional three-way switch 145 for controlling energization of load 26 from either of two stations having, respectively, switch operators 145a and 145b. The switch 145 has a common conductor connecting together switch operators 145a and 145b. Operator 145a is selectively connectable to switch terminals 141a and 141c; operator 145b is selectively connectable to switch terminals 141b and 141d. Switch 145 thus provides a connection between contacts 141a, 141c on one side of the switch and contacts 141b, 141d, on the opposite side of the switch.

Energization of load 26, which is preferably a lamp, is controlled by Triac 28, having a gate terminal 34 into which current is supplied for controlling the ON/OFF state of the Triac. The current supplied to the gate 34 flows through a four diode, full wave bridge 144 from a connection 139 at one end of load 26 functioning as a current supply.

Diodes 147, 149, 151 and 153 are connected respectively to switch terminals 141a, 141b, 141c and 141d. The anode of diode 147 is connected to junction 146 of bridge 144 and the cathode of diode 151 is connected to gate 168 of SCR 162. The cathode of diode 149 and anode of diode 153 are connected, respectively, to the connection 139. The diodes 147, 149, 151 and 153 are steering diodes that steer current between connection 139 and the bridge circuit 144 so as to provide selective turn on/off of Triac 28 from either of two stations incorporating switch operators 145a and 145b.

The bridge 144 comprises diodes 144a–144d connected together in a conventional manner. The anode of diode 147 is connected to junction 146 of the bridge 144, as aforementioned, and junction 148 is connected to line 24 through resistor 150. Also connected between junction 148 and line 24 are diode 152 and resistor 154.

Resistor 156 and capacitor 158 are connected between junctions 146 and 148 of bridge 144. Also connected between the junctions 146 and 148 are resistor 160 and SCR 162. A transient suppression circuit comprising resistor 164 and capacitor 166 is connected between gate 168 and cathode 170 of the SCR 162.

The operation of the circuit shown in FIG. 7 is as follows: Assuming that switch 145 is initially located in the position shown in FIG. 7 with switch operator 145a in contact with terminal 141a, and operator 145b in contact with terminal 141b, during a positive one-half cycle of line voltage generated by source 20, current flows from line 22 through load 26 to junction 170 of bridge 144 along line 171. SCR 162 is maintained OFF since no gate current is supplied to the gate 168 as a result of the open circuit condition at the switch terminal 141c. Current from bridge junction 170 thus flows through diode 144a through resistor 156 and capacitor 158 to junction 148. From junction 148, current flows through diode 144d to bridge junction 172, and then through the gate junction of Triac 28 through resistor 174 and threshold device 36. After the threshold of threshold device 36 is exceeded, early in the positive one-half cycle, the Triac 28 turns on causing current to flow through load 26 during the remainder of the positive one-half cycle.

During the turn-on period of Triac 28, charge buildup on capacitor 158 discharges through resistor 156, diodes 147 and 149, switch 145, Triac 28, resistors 150 and 154 and diode 152, in seriatim.

During the negative one-half cycle of line voltage, current from ground line 24 flows through the gate junction of the Triac 28, through threshold device 36 and resistor 174 to junction 172 of bridge 144. Following break over of device 36, SCR 162 being OFF, current flows through diode 144b, resistor 156, capacitor 158 and diode 144c to bridge junction 170 and from junction 146 through diodes 147 and 149 and switch 145 to junction 139. Current flows from bridge junction 170 and junction 139 back to line 22 through load 26. SCR 162 is maintained OFF as a result of the open circuit at junction 141c.

While Triac 28 turns-on, which occurs early in the negative half cycle, load current flows through the load 26 while capacitor 158 again discharges through the anode terminals of the Triac.

Accordingly, during each one-half cycle of operation, capacitor 158 successively charges and discharges, maintaining the voltage on the capacitor low so as to prevent turn-off of Triac 28.

Assuming now that switch operator 145b is moved to establish a connection with contact 141d, as shown in dotted lines to initiate time delay, the operation of the circuit is as follows: During each positive one-half cycle of line voltage, current flows from line 22 through load 26 to junction 170 of bridge 124 along conductor 171. SCR 162 is still maintained OFF by the open circuit at junction 141c, so that current flows through diode 144a, resistor 156, capacitor 158, and diode 144d, in seriatim, to bridge junction 172. The current then flows into the gate junction of Triac 28 through resistor 174 and threshold device 36 to ground line 24.

During each negative one-half cycle of line voltage, current again flows through the gate junction of Triac 28, through bridge 144 including the path through resistor 156 and capacitor 158 to line 22.

The circuit shown in FIG. 7 having switch operator 145a connected to contact 141a and switch operator 145b connected to contact 141d, as described above is thus electrically equivalent to the circuit shown in FIG. 1, and Triac 28 turns-off following a time delay period during which capacitor 158 charges up to a voltage sufficient to block current flow into gate 34 of Triac 28.

Assuming now that switch operator 145a is moved into contact with contact 141c, as shown in dotted lines, during each positive one-half cycle of line voltage, current flows from line 22 through load 26 into gate 168 of SCR 162 through diodes 153 and 151, respectively. Current from connection 139 thus flows through line 171 to junction 170 and through diode 144a from the brige junction 146 to junction 148 through SCR 162, and to the Triac gate 34 through diode 144d, bypassing capacitor 158. The gate current, following break over of threshold device 36, turns Triac 28 on, energizing load 26. After SCR 162 is on capacitor 158 discharges through resistors 156 and 160 and the SCR 162.

During each negative one-half cycle of line voltage, current from line 24 flows to the gate junction of the Triac 28, diac 36, resistor 174, resistor 156 and capacitor 158 in bridge 144, passing through the diodes 144b and 144c.

If either switch operator is now moved to points 141a or 141b, respectively, gate current into gate 168 of SCR 162 is interrupted, and the SCR 162 is turned off, permitting capacitor 158 to charge-up during successive half-cycles of line voltage, until, after a time delay period, current flowing through Triac gate 34 is reduced to a value low enough to turn Triac 28 OFF, de-energizing load 26, and completing the delayed turn-off mode of operation.

In can thus be appreciated that the load 26 can be selectively energized or de-energized by operating either switch operator 145a or 145b and that delayed turn-off is provided by the circuit from either of the operators.

Figure 8C:
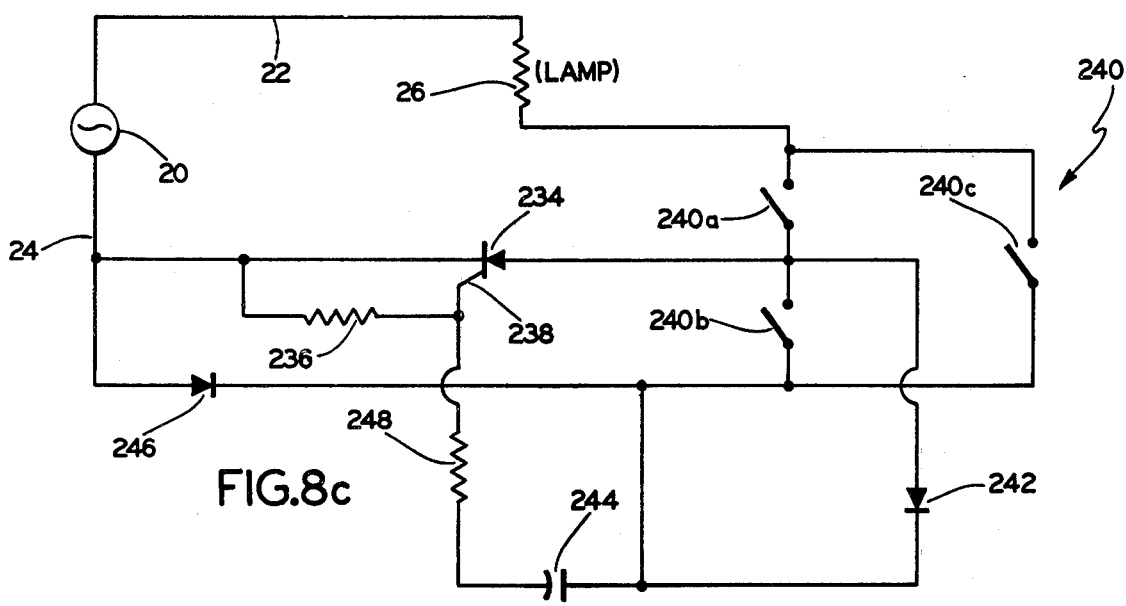
FIGS. 8a-8c are schematic diagrams of three versions of the delayed turn-off switch, in accordance with the invention, including multiple contact switches for providing full wave, one-half wave, delayed turn-off and off modes of operation.
Figure 8B:
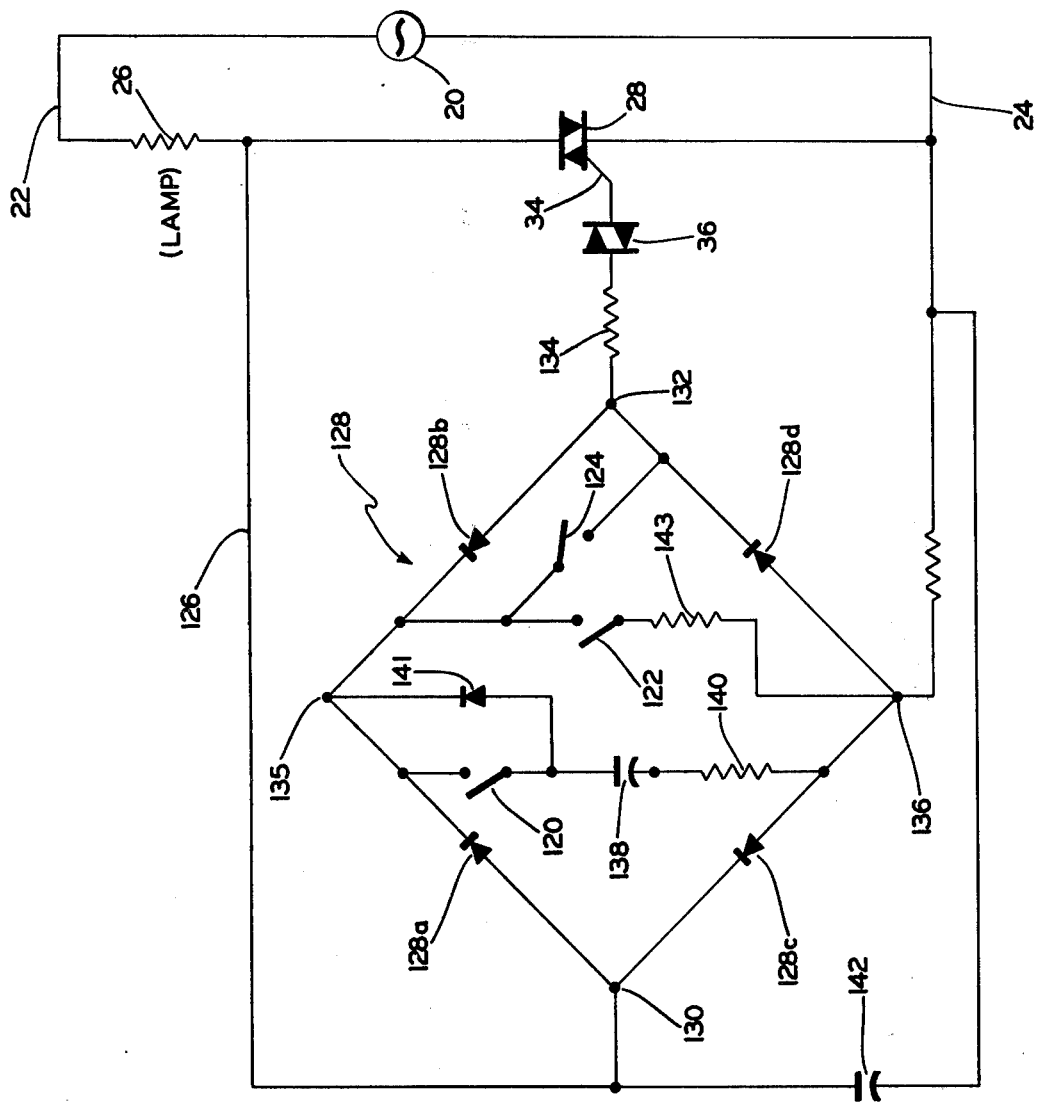
Figure 8A:
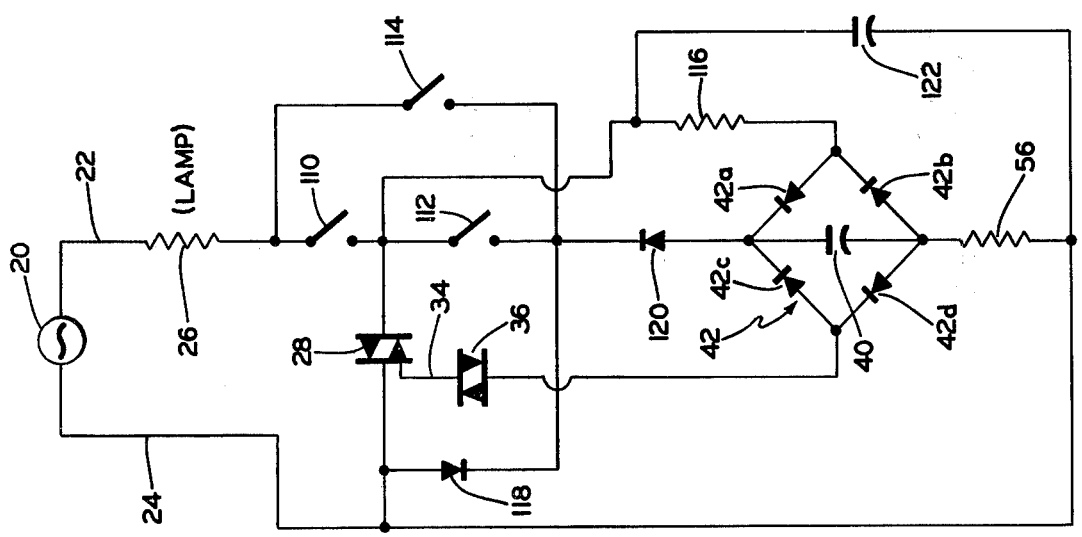

In accordance with FIGS. 8a-8c, there are illustrated three versions of another embodiment of a delayed turnoff switching circuit, there being included manually controlled switches for selectively providing the following functions:

[a] low brightness
[b] high brightness
[c] delayed turn-off
[d] OFF

Referring first to FIG. 8a, the switching circuit shown therein is similar to the circuit shown in FIG. 1, wherein there is provided a multiple function switch having switch contacts 110, 112 and 114. The modes of operation controlled by contacts 110, 112 and 114 are summarized below:

| SWITCH 110 | SWITCH 112 | SWITCH 114 |
| --- | --- | --- |
| Half Wave: Open [Dim] | Open | Closed |
| Full Wave: Closed [Bright] | Closed | Closed |
| Delayed: Closed Turn-Off | Open | Open |
| Off: Open | Closed | Open |

The switches 110, 112 and 114, which are controlled by a single shaft or operator (not shown) accessible to the user, can be located either inside a lamp socket, in a conventional manner, or externally to the socket.

The full wave or "bright" of operation, wherein lamp 26 is maintained full-on, i.e., continuously full wave energized by source 20, all switches 110, 112 and 114 are closed. During the positive one-half cycles of line voltage, current flow is established between lines 22 and 24 through the load 26 via switch 110 and Triac 28. Gate current for turning Triac 28 on during the positive half cycles is established through switch 110, resistor 116, diode 42a, capacitor 40, diode 42d and threshold device 36 in seriatim. During each negative one-half cycle of line voltage, on the other hand, current flow is established to load 26 through diode 118 and switch 114 or switches 110 and 112, Triac 28 being bypassed. Charge build-up on capacitor 40 during each positive one-half cycle leaks off during each negative one-half cycle and when Triac 28 conducts so that the voltage drop across the capacitor remains insufficient to cause turn-off of Triac 28. The discharge path for capacitor 40 during negative one-half cycles is through diode 120, switch 112, capacitor 122 and resistor 56.

The half-wave or "dim" mode of operation, that is, wherein lamp load 26 is continuously energized with one-half cycle current, is effected with switches 110 and 112 open and switch 114 closed. In this condition, Triac 28 and the gate circuit thereof including bridge 42 are electrically disconnected from source 20 by the open switches 110 and 112, and the load 26 is thereby energized directly from source 20 through diode 118. The diode 118 provides the half wave rectification required for the lamp dimming function whereby current flows through the lamp 26 only during each negative one-half cycle of line voltage.

The delayed turn-off mode, that is, wherein lamp 26 is energized with full cycle current for only a predetermined period of time, is provided with switch 110 closed and switches 112 and 114 open. In that condition, Triac 28 is connected to load 26. Also connected to load 26 is resistor 116 and capacitor 112. During each positive one-half cycle, current flows through closed switch 110 and into the gate of Triac 28 via capacitor 40, resistor 116, diodes 42a and 42d and diac 36 causing charge to build-up on the capacitor. During each negative one-half cycle, there is also current flow established into gate 34 of Triac 28, through diac 36 capacitor 40 via diodes 42b and 42c. Triac 28 thus conducts during each positive and negative one-half cycle following break over of threshold device 36. As described in detail above in connection with the operation of the embodiment shown in FIG. 1, gate current decreases during charge build-up on capacitor 40 until there is insufficient gate current to ignite Triac 28, and the Triac is turned-off, de-energizing load 26.

In practice, the circuit shown in FIG. 8a is manually switched from the full brightness mode of operation to the delayed turn-off mode, e.g., when the user is leaving a room and acts to turn off lamp 26. This is accomplished by initially closing switches 110, 112 and 114 to provide the full wave energization function, and then opening switches 112 and 114 to initiate the delayed turn-off function. The described switching, as aforementioned, is effected by rotating a single switch shaft or operator suitably connected to provide the switching sequence as described.

In the OFF mode, the circuit shown in FIG. 8a is completely disconnected from source 20 by opening switches 110 and 114, and this is normally done following a delayed turn-off operation in order to provide a mechanical disconnection of the Triac 28 from the source 20.

In accordance with the circuit shown in FIG. 8b, the switches 120, 122 and 124 are operated to provide the functions tabulated below:

| SWITCH 120 | SWITCH 122 | SWITCH 124 |
| --- | --- | --- |
| Half Wave: Open [Dim] | Open | Closed |
| Full Wave: Open [Bright] | Closed | Open |
| Delayed: Closed Turn-Off | Open | Open |
| Off: Open | Open | Open |

As in the embodiments of the invention described above, load 26, which is preferably an electric lamp, is energized by power source 20 under control of Triac 28. The Triac 28 has a gate terminal 34 that is controlled by current from line 126 to line 24 through the gate junction of the Triac. Located in the gate circuit of the Triac 28 is a four diode full wave bridge 128 comprising the diodes 128a–128d, junctions 130 and 132 of the bridge being connected to the line 126 and to gate 34 of Triac 28. Between the junction 132 and gate 34 there is provided a resistor 134 for current limiting and threshold device 36 corresponding to device 36 in FIG. 1. Between junctions 135 and 136 are connected, in series, the switch 120, capacitor 138, and resistor 140. A diode 141 is connected from junction 135 to the common connection between switch 120 and capacitor 138. Similarly, connected in series between junctions 135 and 136 of the bridge 128 are the swwitch 122 and a resistor 143. The remaining switch 124 is connected between junctions 132 and 135 of bridge 128 for selectively bypassing the diode 128b. A stabilizing capacitor 142 is connected between junction 130 of bridge 128 and line 24.

In a manner similar to switches 110, 112, and 114 in FIG. 8a, switches 120, 122 and 124 are preferably incorporated in a conventional rotary switch mechanism having suitable camming which successively closes each of the switches in order during rotation. In a rotary switch position calling for full wave energization of load 26, switch 122 is closed, with switches 120 and 124 remaining open. During each positive one-half cycle of voltage generated by source 20, current flows from line 126 to the gate 34 of Triac 28 through diode 128a, switch 122, resistor 143, diode 128d, resistor 134 and threshold device 36, in seriatim. During each negative one-half cycle, current flows from line 24 to the gate junction of Triac 28, and then to line 126 through threshold device 36, resistor 134, diode 128b, switch 122, resistor 143 and diode 128c, in seriatim.

Triac 29 turns on following break over of threshold device 36 early in each positive and negative one-half cycle of line voltage providing current flow through load 26 for substantially full wave energization.

In the delayed turn-off mode, with the rotary switch now advanced so as to cause switch 120 to be closed, with switches 122 and 124 remaining open, there is gate current established through capacitor 138 in a manner similar to the circuit described in connection with FIG. 1 resulting in delayed turn-off operation. Current flow through bridge 128, during each positive one-half cycle is established through diode 128a, switch 120, capacitor 138, resistor 140, diode 128d, resistor 134 and diac 136. During each negative one-half cycle, the Triac gate current is established through diode 128b, switch 120, capacitor 138, resistor 140, diode 128c, resistor 134 and diac 36, in seriatim.

In the half wave mode of operation (dim), only switch 124 is closed. During each positive one half cycle of voltage generated by source 20, gate current for energizing Triac 28 is established, in seriatim, through diode 128a, switch 124, resistor 134 and threshold device 36. Triac 28 thus causes positive load current to flow through load (lamp) 26. During each negative half cycle of voltage, on the other hand, no gate current flows through Triac 28 due to the open circuits at switches 120 and 122 as well as reverse biasing of diodes 128a and 141. Triac 28 is turned off during the negative one-half cycles, whereby load 26 is one-half wave energized.

In a final position, with each of the switches 120, 122 and 124 open, no current flow paths are established between junctions 130 and 132 of bridge 128 so that Triac 28 is maintained OFF. Capacitor 142 tends to cause any transients appearing across Triac 28 to bypass the Triac, thereby preventing unintentional turn-on. This defines the OFF mode of operation.

The embodiment of the invention shown in FIG. 8c is related to the embodiments shown in FIGS. 8a and 8b, except that in FIG. 8c, one half wave rather than full wave energization is provided during the delayed turn-off mode. Load 26, which is preferably a lamp, is energized by power source 20 through SCR 234. Stabilization resistor 236 is connected between gate 238 of the SCR and ground line 24.

A switching arrangement 240 comprising switches 240a–240c is connected between load 26 and SCR 234. The anode of a diode 242 is connected between switches 240a and 240b and the cathode thereof is connected to capacitor 244 and also to the cathode of a diode 246. The anode of diode 246 in turn is connected to the ground 24. Capacitor 244 and resistor 248 are connected in series with gate 238 of SCR 234.

The operation of the circuit shown in FIG. 8c is tabulated below:

| SWITCH 240a | SWITCH 240b | SWITCH 240c |
|---|---|---|
| Half Wave: Open [Dim] | Open | Closed |
| Full Wave: Closed [Bright] | Closed | Closed |
| Delayed: Closed Turn-Off | Open | Open |
| Off: Open | Closed | Open |

In the bright position wherein lamp load 26 is to be full wave energized, during each positive one-half cycle of line voltage generated by source 20, current flows through load 26 and switch 240a to SCR 234. SCR 234 is turned-on by gate current flowing through switch 240a, diode 242, capacitor 244 and resistor 248. Accordingly, SCR 234 is turned-on during substantially the entire positive one-half cycle. While SCR 234 is turned-on, charge on capacitor 244 from gate current discharges through switch 240b, SCR 234 and resistors 236 and 238, preventing voltage build-up on the capacitor large enough to prevent turn-on of the SCR.

During each negative one-half cycle, current flow is established to load 26 through diode 246 and switch 240c. The SCR 234, which blocks current flowing from line 24 to line 22, is electrically bypassed. Thus, there is full wave energization of load 26 during both positive and negative one-half cycles of voltage generated by source 20.

In the dim mode, tabulated above, wherein load 26 is supplied with one-half wave rectified current, only switch 240c is closed, whereby diode 246 is connected in series with the load. Since switches 240a and 240b are open, SCR 234 is maintained OFF. Load 26 thus receives one-half wave energization via diode 246. Assuming load 26 is a lamp, the lamp is continuously turned on at reduced intensity.

In the delay turn-off mode, as tabulated above, only switch 240a is closed. SCR 234 is thus connected in series with load 26 and source 20. During each positive one-half cycle of line voltage, the SCR 234 receives gate current through diode 242, capacitor 244 and resistor 248, charging the capacitor. During the negative one-half cycles, the SCR 234 blocks load current since it is a unidirectional device. Capacitor 244 is prevented from discharging during the negative half-cycles by reverse biased diodes 242 and 246 as well as by open switches 240b and 240c. After a time delay period, capacitor 244 becomes charged up sufficiently to reduce the magnitude of gate current so as to prevent turning-on SCR 234.

It is recognized that the time delay period of FIG. 8c, wherein capacitor 244 is charged during one-half wave current flow, is substantially longer than the turn-off delays described in the circuits shown above, wherein the corresponding capacitor is charged by full wave rectified gate current.

Finally, in the OFF mode, only switch 240b is closed; switches 240a and 240c are open creating an open circuit between load 26 and SCR 234. The open circuit prevents flow of any load current so that load 26 is deenergized.

Figure 9:
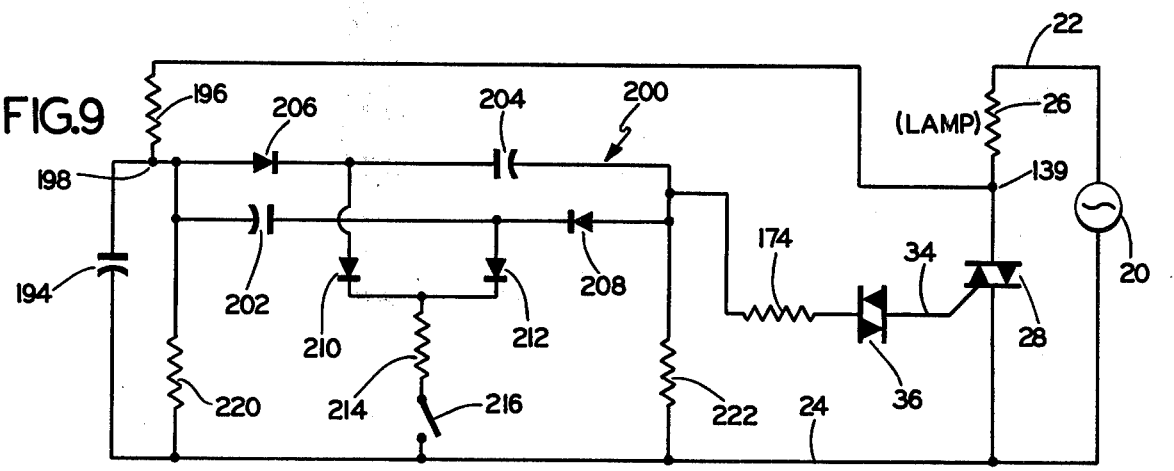
FIG. 9 is a schematic diagram of an additional embodiment of the invention wherein a pair of capacitors, together with steering diodes, are connected in the gate circuit of a Triac to provide the delayed turn-off function.

In accordance with the embodiment of the invention shown in FIG. 9, the delayed turn-off switching function is provided in conjunction with a Triac control circuit, wherein a pair of capacitors 202, 204 are used together with steering diodes 206, 208, 210 and 212 to gradually reduce Triac gate current to zero following an opening of switch 216. Junction 139 functioning as a source of gate current is connected to stabilization capacitor 194 through resistor 196. Junction 198 between resistor 196 and capacitor 194 is connected to gate 34 of the Triac 28 through a gate control circuit 200 comprising the first and second capacitors 202 and 204 as well as the diodes 206, 208, 210 and 212. A resistor 214 is connected at one end thereof to the cathodes of diodes 210 and 212 and the other end thereof is connected to switch 216. Switch 216 selectively connects said other end of resistor 214 to ground 24.

The gate control circuit 200 is connected to gate 34 of Triac 28 through resistor 174 and threshold device 36. Resistors 220 and 222 are connected between ground line 24 and the anodes of diodes 206 and 208, respectively.

In operation, assuming that switch 216 is initially closed for the purpose of providing continuous energization of load 26, gate current to Triac 28 is established during each positive one-half cycle through resistor 196, diode 206 and capacitor 204 as well as resistor 174 and threshold device 36. Following break over of threshold device 36 during each positive one-half cycle of line voltage, Triac 28 turns on, bringing the voltage at junction 198 on control circuit 200 essentially to ground level. As a result, voltage build-up on capacitor 204 occurring during the earlier part of the half cycle discharges through diode 210, resistor 214, switch 216 and resistor 222.

During the negative one-half cycles, gate current flow through the Triac 28 is established through diode 208 and capacitor 202 of the gate control circuit 200. Following break over of the threshold device 36, charge build-up on capacitor 204 is discharged through diode 212, resistor 214, switch 216 and resistor 220.

Accordingly, with switch 216 closed, capacitors 202 and 204 are discharged following turn-on of Triac 28 during each positive and negative half cycle of line voltage. Since the voltages on capacitors 202 and 204 are maintained low as a result of the successive discharging thereof, there is no substantial reduction in gate current for energizing Triac 28, and load 26 is energized continuously by source 20.

On the other hand, when switch 216 is open, there is no discharge path for charge build-up on the capacitors 202 and 204 during the positive and negative half cycles of line voltage. Capacitors 202 and 204 are permitted to charge up, decreasing the magnitude of gate current so as to turn-off Triac 28 after a time delay period. Switch 216 in the open position thus establishes the delayed turn-off function.

Figure 10:
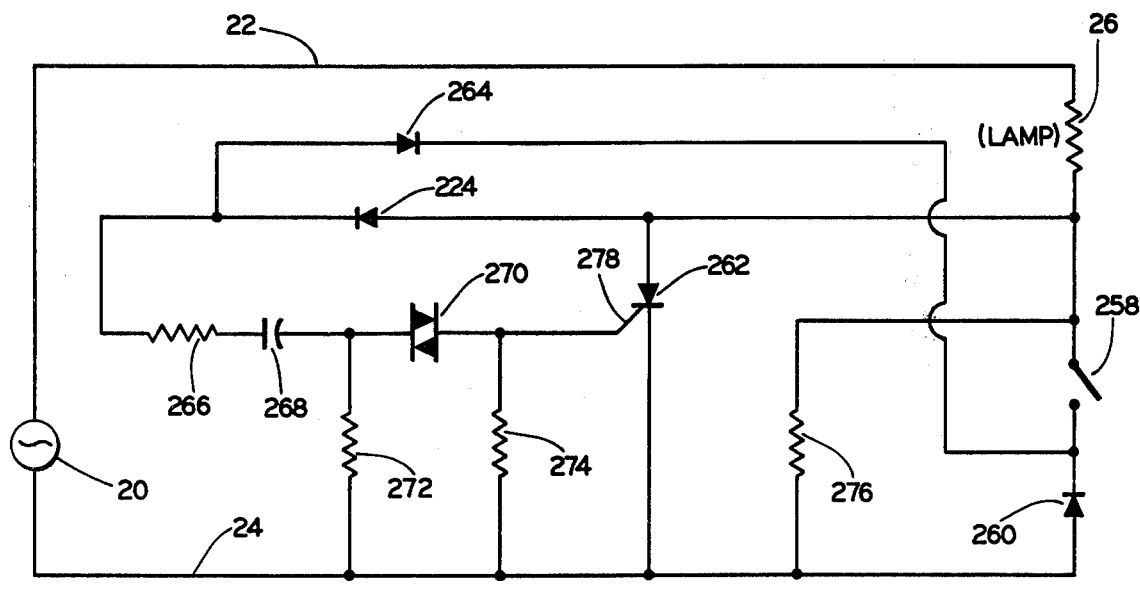
FIG. 10 is a schematic diagram of another embodiment, wherein a load is normally full wave energized, and is one-half wave energized during the delayed turn-off period.

FIG. 10 shows another embodiment of the delayed turn-off switching circuit of the invention, including a switch 258 which, when closed, causes full wave energization of load 26 and when open, causes there to be half-wave energization of the load during delayed turn-off.

In series with load 26 between lines 22 and 24 are connected the switch 258 and a diode 260. An SCR 262 is connected between load 26 and ground line 24. Gate current to SCR 262 is provided by a gate supply circuit comprising in series, diode 224, resistor 266, capacitor 268 and threshold device 270. Stabilizing resistors 272 and 274 are connected from opposite ends of device 270 to ground line 270. A diode 264 is connected between the cathodes of diodes 224 and 260, and a resistor 276 is connected between load 26 and line 24 bypassing the switch 258 and diode 260.

In operation, when switch 258 is closed, during the positive one-half cycles of line voltage generated by source 20, current flows through load 26, diode 224 and into gate terminal 278 of SCR 262 through resistor 266, capacitor 268 and threshold device 270.

Following breakover of threshold device 270 during each positive one-half cycle, SCR 262 is turned-on, thereby causing current flow through load 26 to ground 24. While SCR 262 is turned-on, charge build-up in capacitor 268 discharges along a discharge path provided by resistor 266, diode 264, switch 258, resistor 276 and resistor 272. The voltage drop across capacitor 268 is thus maintained low so as to prevent blockage of gate current to the extent that SCR 262 would shut off due to "gate current starvation".

During the negative one-half cycles of line voltage generated by source 20, current flow through load 26 is established through diode 260, SCR 262 being bypassed. Accordingly, with switch 258 closed, full wave current is caused to flow through load 26.

On the other hand, when switch 258 is open, positive one-half cycle current flow is provided through load 26 and SCR 262 to line 24. Gate current is supplied to gate 278 of SCR 262 through diode 224, resistor 266, capacitor 268 and threshold device 270 in seriatim. There is no discharging of capacitor 268 during turn-on of SCR 262 due to the open circuit at switch 258.

During the negative one-half cycles, current flow is blocked by the reverse biased SCR 262, and there is no current flow through the open switch 258. Resistor 276 is large so that current flowing through load 26 through resistor 276 is small.

Thus, with switch 258 open, capacitor 258 gradually charges up, decreasing gate current until SCR 262 is turned-off, whereby delayed turn-off during half wave energization of load 26 is effected.

In this disclosure there is shown and described only the preferred embodiments of the invention. It is to be understood that the invention is capable of use in other combinations and environments and is capable of changes or modifications within the scope of the inventive concept as expressed herein. For example, in each of the embodiments disclosed, load 26 may be located in either one of the lines 22 and 24, as desired.

What is claimed is:

1. A lamp dimmer circuit having delayed turn-off, comprising:

a voltage source;

a load adapted to be energized from said source;

a gate controlled switch operative for controlling energization of said load, said controlled switch including a pair of output terminals connected in circuit with said source and said switch, and a gate for controlling an on-off state of said switch;

means derived from said voltage source for supplying a control current to the gate of said switch;

a turn-off capacitor connected between said gate current means and said gate;

diode means connected in series with said turn-off capacitor and said gate for causing unidirectional current flow through said capacitor for operating said gate controlled switch in a one-half wave mode of operation;

dimmer means for controlling a firing angle of said gate controlled switch, said dimmer means including an RC circuit means having variable resistance means, said RC circuit means connected in circuit with said turn-off capacitor and said gate current means;

switch means selectively by-passing the variable resistance means of said RC circuit, said switch means being closed for by-passing said variable resistance means in a delayed turn-off mode of operation and being open in a dimmer mode of operation; and means for enabling said one-half wave mode operating means only during the delayed turn-off mode.

2. The circuit of claim 1, wherein said diode means comprises a full wave diode bridge.

3. A delayed turn-off switching circuit, comprising:

a voltage source;

a load adapted to be energized from said source;

a gate controlled switch operative for controlling energization of said load, said switch including a pair of output terminals connected in circuit with said voltage source and said load, and a current responsive gate for controlling an ON/OFF condition of said switch;

means derived from said voltage source for supplying a control current to the gate of said switch;

a capacitor connected between said current means and said gate, said capacitor being operative to reduce the magnitude of gate current flow for turning off said gate controlled switch during a delayed turn-off mode of operation;

a four diode, full wave bridge, said gate controlled switch connected across a pair of output junctions of said bridge, an input terminal thereof being connected to said voltage source and said load;

an SCR for bypassing said gate controlled switch in a load energization mode of operation; and additional switching means including steering diode means in a gate circuit of said SCR for controlling an on/off condition of said gate controlled switch from either of two remote locations.

4. A delayed turn-off switching circuit comprising:

a voltage source;

a load adapted to be energized by said voltage source;

a gate controlled switch operative for controlling energization of said load, said switch including a pair of output terminals connected in circuit with said voltage source and said load, and a current responsive gate terminal for controlling an on-off condition of said switch;

means derived from said voltage source for supplying a control current to the gate of said switch;

a capacitor connected between said control current means and said gate;

switch means for selectively discharging said capacitor, said switch means being (1) open in a delayed turn-off mode of operation, whereby current flow in the gate of said gate controlled switch causes said capacitor to charge, said gate controlled switch thereby being turned off after a time delay period caused by gate current starvation, and (2) closed in a normal load energization mode of operation to discharge said capacitor;

circuit means for causing a portion of said gate current flowing through said capacitor to bypass said gate, said circuit means being controlled in response to a predetermined magnitude of voltage derived from said voltage source; and said circuit means including an SCR connected between said capacitor and one of said output terminals of said gate controlled switch, with said SCR having a gate terminal and a threshold device connected to said gate terminal for turning said SCR or in response to the predetermined voltage magnitude.

5. A delayed turn-off switching circuit, comprising:

a voltage source;

a load adapted to be energized by said source;

a gate controlled switch operative for controlling energization of said load, said switch including a pair of output terminals connected in circuit with said voltage source and said load, and a current responsive gate terminal for controlling an on/off condition of said switch;

means derived from said voltage source for supplying control current to a gate of said switch;

a capacitor connected between said control current means and said gate;

switch means for selectively by-passing said capacitor, said switch means being open in a delayed turn-off mode of operation, whereby current flow in the gate of said gate controlled switch causes said capacitor to charge, said gate controlled switch being thereby turned-off after a time delay period caused by gate current starvation, said switch means being closed to by-pass said capacitor in a normal load energization mode of operation;

additional switching means for selectively operating the load in (1) a full wave load energization mode, (2) a one-half wave load energization mode wherein said load is connected to said voltage source through a diode, (3) said delayed turn-off mode, and (4) an off mode; and the gate controlled switch further including an SCR, a first diode being connected in series with the capacitor in a gate circuit of said SCR, and a second diode being connected in antiparallel to said SCR and in circuit with said additional switching means, said second diode being connected to said load and said voltage source during mode (3).

* * * * *

UNITED STATES PATENT AND TRADEMARK OFFICE
CERTIFICATE OF CORRECTION

PATENT NO. : 4,160,192
DATED : July 3, 1979
INVENTOR(S) : Raymond J. McAllise

It is certified that error appears in the above-identified patent and that said Letters Patent are hereby corrected as shown below:

Column 7, line 13, change "30" to -36-;

Column 7, line 43, change "244" to -224-;

Column 7, line 51, change "244" to -224-;

Column 7, line 52, change "244" to -224-;

Column 7, line 54, change "244" to -224-;

Column 7, line 60, change "resistor" at the end of the line to -SCR-;

Column 12, line 26, change "While" to -When-;

Column 13, line 17, change "In" to -It-;

Column 14, line 20, change "112" to -122-;

Column 15, line 14, change "swwitch" to -switch-; and

Column 20, line 26, change "or" to -on-.

Signed and Sealed this

Ninth Day of October 1979

[SEAL]

Attest:

RUTH C. MASON
Attesting Officer

LUTRELLE F. PARKER
Acting Commissioner of Patents and Trademarks